(12) United States Patent
Wang et al.

(10) Patent No.: US 12,265,710 B2
(45) Date of Patent: Apr. 1, 2025

(54) MEMORY MANAGEMENT PROCEDURES FOR WRITE BOOST MODE

(71) Applicant: Micron Technology, Inc., Boise, ID (US)

(72) Inventors: Xing Wang, Shanghai (CN); Zhen Gu, Shanghai (CN); Xu Zhang, Shanghai (CN); Liping Xu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 178 days.

(21) Appl. No.: 17/630,113

(22) PCT Filed: Mar. 16, 2021

(86) PCT No.: PCT/CN2021/081074
§ 371 (c)(1),
(2) Date: Jan. 25, 2022

(87) PCT Pub. No.: WO2022/193129
PCT Pub. Date: Sep. 22, 2022

(65) Prior Publication Data
US 2023/0359365 A1    Nov. 9, 2023

(51) Int. Cl.
*G06F 3/06* (2006.01)
(52) U.S. Cl.
CPC .......... *G06F 3/0616* (2013.01); *G06F 3/0634* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| 9,256,381 B1 * | 2/2016 | Fultz ................. G06F 3/0617 |
| 2019/0179698 A1 | 6/2019 | Liu et al. |

(Continued)

FOREIGN PATENT DOCUMENTS

| CN | 111104045 A | 10/2018 |
| CN | 111506262 A | 3/2020 |
| WO | 2018038811 A1 | 7/2017 |

OTHER PUBLICATIONS

ISA/CN, "International Search Report and Written Opinion of the International Searching Authority," issued in connection with Int'l Appl. No. PCT/CN2021/081074, dated Dec. 15, 2021 (8 pages).

*Primary Examiner* — Michael Alsip
(74) *Attorney, Agent, or Firm* — Holland & Hart LLP

(57) ABSTRACT

Methods, systems, and devices for memory management procedures for write boost mode are described. A memory system may receive a command to write data. The memory system may write the data to a first location of the memory system using a first mode for storing one bit per memory cell based on receiving the command. The memory system may select a first portion of the data to rewrite to the memory system using a second mode for storing two or more bits per memory cell based on one or more parameters satisfying one or more thresholds. The memory system may write the first portion of the data to a second location of the memory system using the second mode based on selecting the first portion of the data. The memory system may maintain a second portion of the data at the first location of the memory system.

21 Claims, 5 Drawing Sheets

(56) References Cited

U.S. PATENT DOCUMENTS

2021/0011669 A1 1/2021 Park et al.
2021/0049064 A1 2/2021 Liang

* cited by examiner

MEMORY MANAGEMENT PROCEDURES FOR WRITE BOOST MODE

CROSS REFERENCE

The present Application for Patent is a 371 national phase filing of International Patent Application No. PCT/CN2021/081074 by Wang et al., entitled "MEMORY MANAGEMENT PROCEDURES FOR WRITE BOOST MODE," filed Mar. 16, 2021, assigned to the assignee hereof, and expressly incorporated by reference herein.

FIELD OF TECHNOLOGY

The following relates generally to one or more systems for memory and more specifically to memory management procedures for write boost mode.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
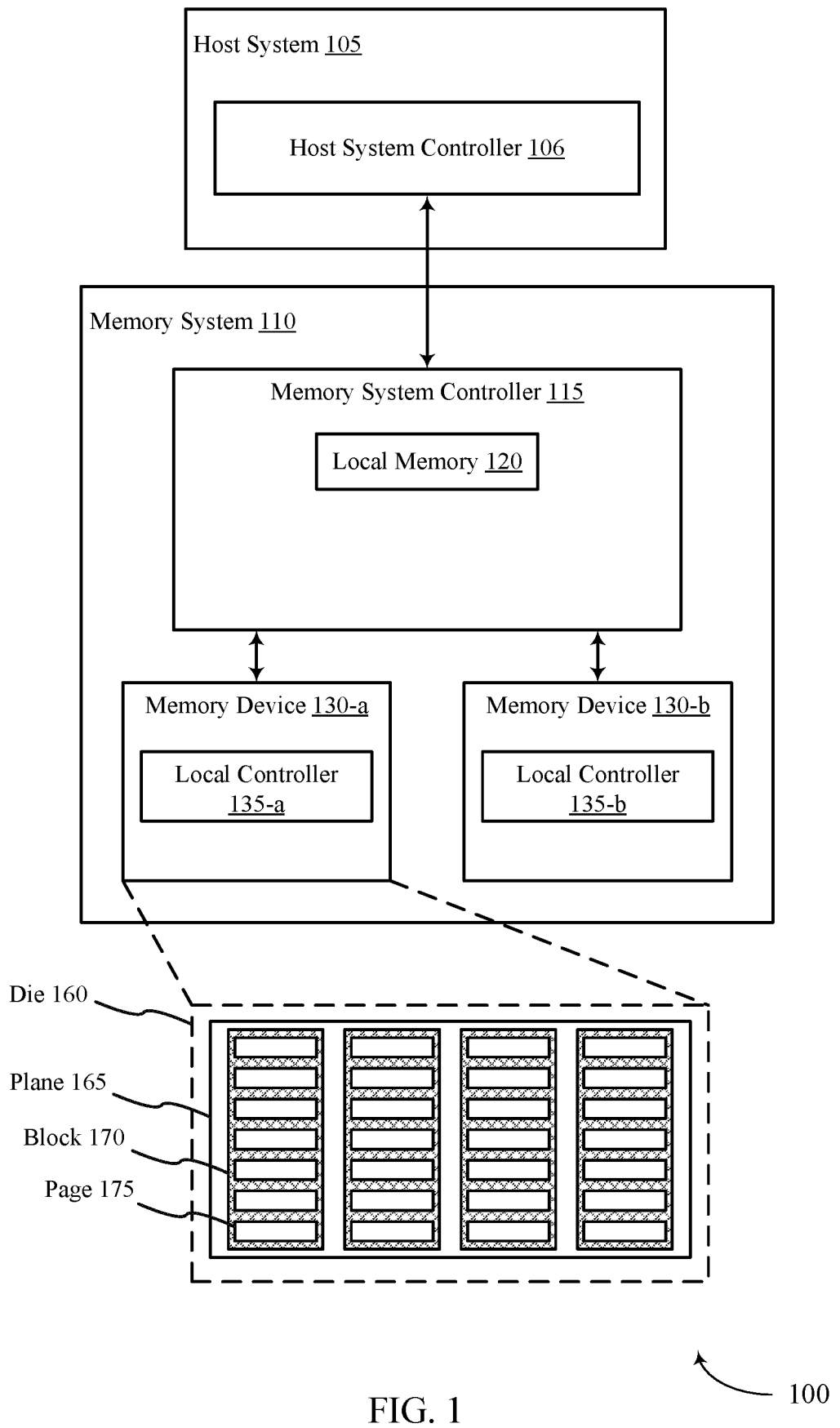
FIG. 1 illustrates an example of a system that supports memory management procedures for write boost mode in accordance with examples as disclosed herein.

Some memory systems may support multiple access modes, such as a single level cell (SLC) access mode, multi-level cell (MLC) access modes (e.g., two levels), a tri level cell (TLC) access mode, a quad level cell (QLC) access mode, or other quantity of levels. For example, a system may include a host system and a memory system coupled with the host system. The memory system may include one or more memory arrays for storing data. The one or more memory arrays may include not-and (NAND) cells for such storage. In some examples, the memory system may write data to the memory arrays using a SLC access mode. For example, the memory system may write a single bit of information to a respective memory cell, which may result in relatively high data throughput (e.g., relatively high performance for data storage), among other advantages. In some examples, the memory system may write data to the memory arrays in accordance with other access modes. For example, the memory system may write two, three, four, or more bits of information to a respective memory cell of the memory array if operating in different access modes, among other examples, which may result in increased storage density and improved memory utilization, among other advantages.

However, in some cases the memory system may operate in such access modes relatively inefficiently. For example, the memory system may experience relatively high latency or a high error rate (e.g., due to accessing data using a relatively low performance access mode such as a MLC access mode compared to a SLC access mode). Additionally or alternatively, the memory system may experience a relatively poor life span due to operating in the access modes inefficiently. For example, the memory system may write incoming data to a first location using a first mode (e.g., incoming data from one or more commands may be written to one or more SLC blocks). The memory system may transfer all the data to a second location using a second mode (e.g., the data may be rewritten to one or more TLC blocks at a later time) to increase the density of the data storage. The process of transferring data from SLC blocks (after an initial write) to MLC, TLC, or QLC blocks may result in a relatively high write amplification (e.g., information may be written a relatively high quantity of times). Such a relatively high write amplification may result in wear of the memory system, a reduced life span of the memory system, or both.

Accordingly, a memory system may implement memory management procedures as described herein. For example, the memory system may receive a command to write data to the system from a host system. The memory system may write the data to a first location of the memory system using a first mode. For example, the memory system may write the data to one or more memory blocks using an SLC mode where each memory cell stores one bit of the data. The memory system may select a first portion of the data to rewrite to the memory system using a second mode based on one or more parameters. For example, the memory system may write a first portion of the data to a second location using the second mode (e.g., a MLC mode, a TLC mode, a QLC mode, or some other mode). Additionally or alternatively, the memory system may maintain a second portion of the data in a block that uses the first mode (e.g., SLC mode).

In some cases, this may include the memory system maintain a second portion of the data at the first location or moving the data to a different block that uses the first mode. By selectively maintaining some data in the first location (e.g., memory blocks storing information using the first mode) and transferring some data to the second location (e.g., memory blocks storing information using the second mode), the memory system may realize reduced wear for memory cells (e.g., extended lifespan of the memory system), improved memory utilization and/or memory density, or both, while maintaining relatively high performance, among other advantages.

The memory system may select the first portion of the data to rewrite using the second mode in response to whether one or more parameters satisfy one or more thresholds. For example, the memory system may identify one or more recency parameters associated with the data written to the first location (e.g., the data associated with the one or more commands). A recency parameter may indicate how recently an associated portion of data was accessed at the first location (e.g., the recency parameter may indicate a duration of time between writing the data to the first location and selecting the first portion of the data). Additionally or alternatively, the memory system may identify one or more frequency parameters associated with the data. A frequency parameter may indicate a frequency that an associated portion of data was accessed over a duration of time (e.g., the memory system may track a quantity of access operations performed for the associated portion of data for a duration of time). The memory system may select the first portion of the data to rewrite to the second location, the second portion of the data to maintain at the first location, or both based on whether the one or more parameters satisfy the one or more thresholds. For example, data that is relatively recently accessed or relatively frequently accessed may be left in the memory blocks associated with the first access mode (e.g., SLC blocks) while relatively old or infrequently accessed data may be moved to blocks that stored data using a mode different than the first mode (e.g., MLC blocks, TLC blocks, QLC blocks). In some examples, such selective relocation of data may be performed in response to a write boost mode being activated.

Features of the disclosure are initially described in the context of systems as described with reference to FIGS. 1 and 2. These and other features of the disclosure are further illustrated by and described in the context of a process flow, an apparatus diagram, and a flowchart that relate to memory management procedures for write boost mode with reference to FIGS. 3-5.

FIG. 1 illustrates an example of a system 100 that supports memory management procedures for write boost mode in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a DIMM interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 if read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells SLCs. Additionally or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be used instead of erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support memory cell access techniques for memory devices. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, if executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

The system 100 may implement memory management procedures as described herein. For example, the memory system 110 may receive one or more commands to write data to the memory device 130 or 140 from the host system 105. The memory system 110 may write the data to a first location of the memory system (e.g., one or more blocks 170) using a first mode. For example, the memory system 110 may write the data using an SLC mode where each memory cell stores one bit of the data. The memory system 110 may select a first portion of the data to rewrite to a second location using a second mode based on one or more parameters. For example, the memory system 110 may write a first portion of the data to the second location using the second mode (e.g., MLC mode, TLC mode, QLC mode, or other mode). Additionally or alternatively, the memory system 110 may maintain a second portion of the data at the first location (e.g., the one or more blocks 170 associated with the first mode) based on the one or more parameters. By selectively leaving some data in the first location (e.g., blocks 170 storing information using an SLC mode) and transferring some data to the second location (e.g., blocks 170 storing information using an MLC mode, a TLC mode, a QLC mode, etc.), the memory system may realize reduced wear for memory cells at the first location (e.g., extended lifespan of the memory system 110), improved memory utilization and/or memory density, or both, while maintaining relatively high performance, among other advantages.

The memory system 110 may select the first portion of the data to rewrite using the second mode in response to whether one or more parameters satisfy one or more thresholds. For example, the memory system 110 may identify one or more recency parameters associated with the data written to the first location. A recency parameter may indicate how recently an associated portion of data was accessed at the first location (e.g., the recency parameter may indicate a duration of time between writing the data to the first location and selecting the first portion of the data). Additionally or alternatively, the memory system 110 may identify one or more frequency parameters associated with the data. A frequency parameter may indicate a frequency that an associated portion of data was accessed (e.g., the memory system may track a quantity of access operations performed for the associated portion of data for a duration of time). The memory system 110 may select the first portion of the data to rewrite to the second location, the second portion of the data to maintain at the first location, or both in response to whether the one or more parameters satisfy the one or more thresholds. For example, data that is relatively recently accessed or relatively frequently accessed may be left in the memory blocks associated with the first access mode (e.g., SLC blocks) while relatively old or infrequently accessed data may be moved to the second location (e.g., TLC blocks). In some examples, such selective relocation of data may be performed in response to a write boost mode being activated. In some examples, the described operations performed by the memory system 110 may instead be performed by the host system 105, or any combination thereof.

Figure 2:
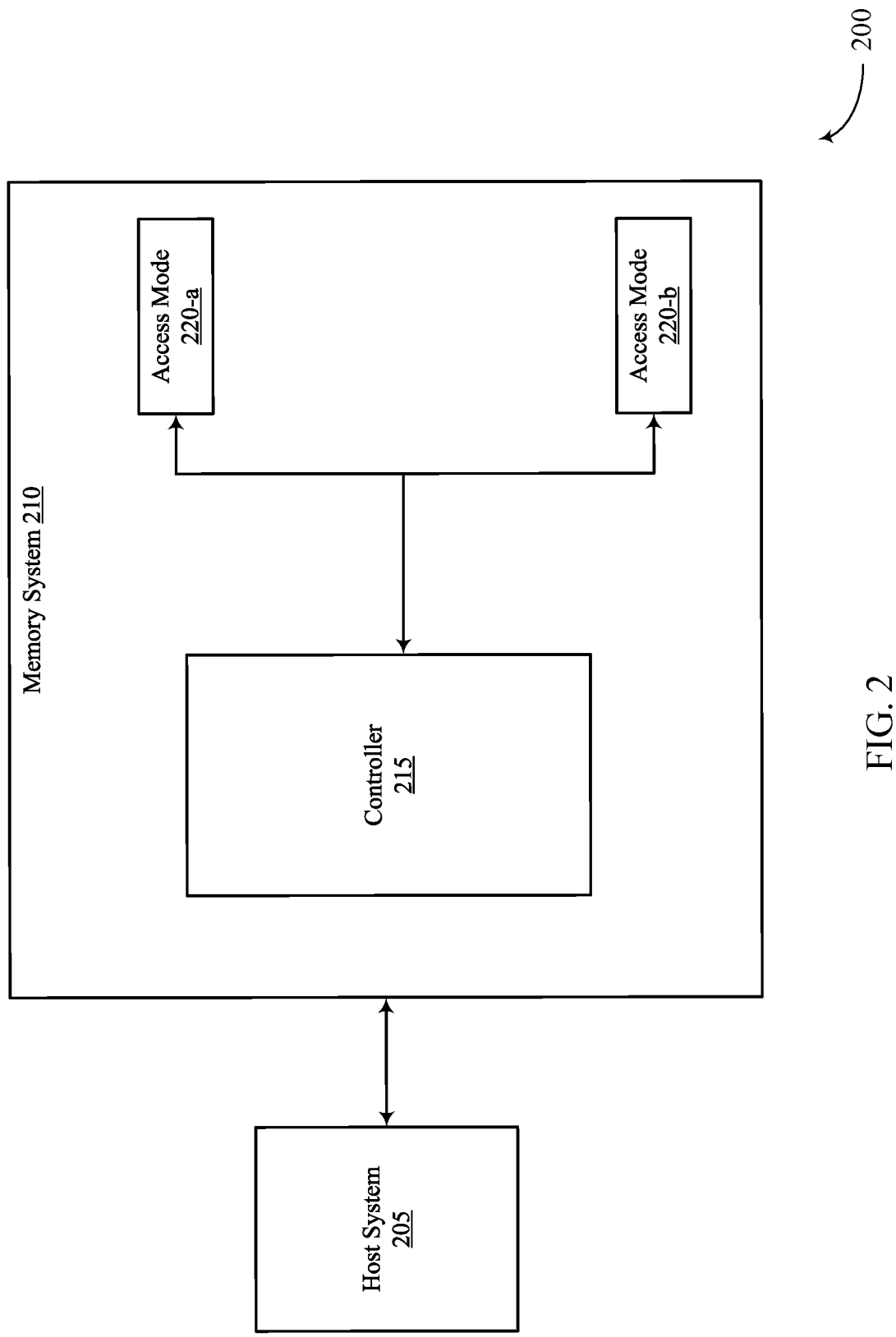
FIG. 2 illustrates an example of a system that supports memory management procedures for write boost mode in accordance with examples as disclosed herein.

FIG. 2 illustrates an example of a system 200 that supports memory management procedures for write boost mode in accordance with examples as disclosed herein. In some examples, the system 200 may implement aspects of the system 100. For example, the system 200 may include a host system 205 and a memory system 210, which may be examples of or include aspects of a host system 105 or a memory system 110 as described with reference to FIG. 1. The memory system 210 may include a controller 215, which may be an example of a memory system controller 115 or a local controller 135 as described with reference to FIG. 1. Generally, the system 200 may illustrate an example system implementing memory management procedures for operation in the access mode 220-a or the access mode 220-b, although any quantity or type of access modes may be used.

Although the various components of the system 200 are shown as separate for illustrative clarity, the components of the system 200 may be combined or additional components may be added. Further, components may be located differently than shown (e.g., the host system 205 may include the controller 215). In some examples, the operations described as being performed by one component may additionally or alternatively be performed by different components.

The system 200 may support multiple access modes 220, such as a SLC access mode, an MLC access mode, a TLC access mode, or a QLC access mode, among other examples of access modes. As an illustrative example, the memory system 210 may be configured to perform access operations (e.g., write operations, read operations, etc.) in an access mode 220-a, an access mode 220-b, or both.

In some examples, the memory system 210 may store data in memory cells (e.g., NAND cells) using the access mode 220-a. As an illustrative example, the access mode 220-a may be an example of a SLC access mode, and the memory system 210 may store a single bit of information to a memory cell in an SLC cache (e.g., a portion of a memory array associated with operations in the access mode 220-a, such as a set of memory cells, memory blocks, etc.). Additionally or alternatively, the memory system 210 may store data in memory cells using the access mode 220-b. As another illustrative example, the memory system may write two bits of information to a respective memory cell of the memory array if operating in an MLC access mode, the memory system may write three bits of information to a respective memory cell of the memory array if operating in a TLC access mode, four bits of information to a memory cell if operating in a QLC access mode, etc. In some examples, the term multi-level cell may refer to any access mode that stores two or more bits of information in a single memory cell or the term multi-level cell may refer to the access mode for storing exactly two-bits of information in a memory cell. The memory system 210 may realize relatively high performance (e.g., relatively high speed or throughput of access operations) if operating in the access mode 220-a. For example, the memory system 210 may be configured to perform commands received from the host faster using the access mode 220-a than using the access mode 220-b. Additionally or alternatively, the memory system 210 may realize relatively improved storage density if operating in the access mode 220-b.

In some examples, the host system 205 may indicate an access mode 220 to the memory system 210. For example, the host system 205 may include a write booster component. The host system 205 may transmit one or more commands for one or more operations to the memory system 210 via a data bus. Additionally or alternatively, the host system 205 may transmit a write booster signal to the memory system 210. The write booster signal may indicate whether the memory system 210 is to perform access operations using the access mode 220-a or the access mode 220-b. As an illustrative example, if the write booster is enabled (e.g., the host device transmits a signal indicating the write booster is enabled), the memory system 210 may use the access mode 220-a to write the data to the memory system faster and then move the data to higher storage density blocks at a later time. As another example, if the write booster is disabled (e.g., the host device transmits a signal indicating the write booster is disabled), the memory system 210 may use the access mode 220-b for one or more operations in response to receiving commands from the host system 205 and store the data to higher-density storage blocks. In some examples, the host system 205 may activate or deactivate the write booster in response to one or more thresholds. For example, the host system 205 may determine that a data amount in the command queue satisfies a threshold (e.g., if more than 20 megabytes (MBs) are in the command queue) and the host system 205 may activate the write booster. As another example, the host system 205 may determine that a data amount in the command queue satisfies a different threshold (e.g., if less than 4 Kilobytes (KBs) are in the command queue) and the host system 205 may deactivate the write booster.

In some examples, the system 200 may be configured with a default access mode 220-*a*. For example, the memory system 210 may operate in the access mode 220-*a* for operations if there is space in an SLC cache (e.g., if a portion of the memory array used for SLC operations has available memory cells), which may result in relatively high performance for processing operations. However, in some cases such an implementation may result in a relatively high write amplification, relatively high latency or a high error rate, or a combination thereof. For example, the memory system 210 may store data for the access operations in a SLC portion of the device and then rewrite the data to a TLC portion of the device for long term storage in order to free up space in the SLC portion for subsequent access operations. Such additional program or erase cycles may result in wear of the memory system 210, which may reduce a reliability or life of the memory system 210. Additionally or alternatively, the memory system 210 may fail to rewrite a relatively large amount of data to the TLC portion, which may reduce an availability of the SLC portion for high performance operations (e.g., there may not be enough space in the SLC portion for data that is accessed relatively frequently or recently, which may degrade performance). Techniques for efficient or selective relocation of data using the access modes 220 may be beneficial to improve the efficiency of the memory system 210. Write amplification may refer to when the amount of information being written in the memory system is more than the amount of information requested by the host system to be written. Such conditions may be a result of garbage collection operations, moving data from SLC blocks to other types of blocks, or other memory management operations.

The system 200 may implement one or more memory management techniques or procedures as described herein. For example, the memory system 210 may receive a set of commands to perform one or more access operations (e.g., the host system 205 may send data to write, among other examples of access operations). The memory system 210 may write the data to a first location using the access mode 220-*a*. For example, the memory system 210 may write the data using an SLC mode to an SLC cache, which may realize relatively high performance (e.g., relatively short write or read times). The memory system 210 may rewrite one or more portions of the data to a second location using the access mode 220-*b* as described herein (e.g., in response to one or more parameters satisfying one or more thresholds). For example, the memory system 210 (e.g., the controller 215) may select a first portion of the data of the first location to rewrite to the second location. As an illustrative example, the first portion of the data may be rewritten to one or more memory blocks using the access mode 220-*b* (e.g., a TLC mode where each memory cell stores three bits, although any other access mode may be used such as an MLC mode, a QLC mode, and the like). Additionally or alternatively, the memory system 110 may maintain one or more other portions of the data at the first location using the access mode 220-*a*. For example, the memory system 210 may select a second portion of the data to be maintained at the first location using the access mode 220-*a* (e.g., the second portion of data may be SLC data to be maintained in the SLC cache). In some examples, the memory system 210 may additionally or alternatively rewrite the second portion to another portion of the first location (e.g., as part of a wear leveling or garbage collection procedure).

In some examples, the memory system 210 may select the first portion of the data or the second portion of the data or both in response to whether one or more parameters satisfy one or more thresholds. For example, the memory system 210 may identify one or more recency parameters associated with the data written to the first location using the access mode 220-*a*. A recency parameter may indicate how recently an associated portion of data was accessed at the first location (e.g., the recency parameter may indicate a duration of time since writing the associated portion of data to the first location). A recency parameter may correspond to a memory cell, a memory block, or another portion of the first location of a memory array.

The memory system 210 may compare the one or more recency parameters to one or more recency thresholds. If a recency parameter fails to satisfy a recency threshold (e.g., the recency parameter indicates a duration less than a threshold duration), the memory system 210 may refrain from transferring a corresponding portion of data to the second location. For example, data that has been stored at the first location for a relatively short duration may correspond to a recency parameter that fails to satisfy the threshold. The memory system 210 may include such data in the second portion of the data that is maintained at the first location in response to the parameter failing to satisfy the threshold. Additionally or alternatively, if a recency parameter satisfies a recency threshold, the memory system 210 may transfer the associated data to the second location (e.g., the memory system 210 may select the associated data as the first portion of data transferred to the second location in response to the satisfied recency threshold). For example, data that has been stored at the first location for a relatively long duration may correspond to a recency parameter that satisfies the threshold (e.g., the recency parameter indicates a duration greater than a threshold duration). The memory system 210 may transfer the data to the second location in response to the recency parameter satisfying the threshold.

Additionally or alternatively, the memory system 210 may identify one or more frequency parameters associated with the data. A frequency parameter may indicate a frequency that an associated portion of data was accessed (e.g., the memory system 210 may track a quantity of access operations performed for the associated portion of data for a duration of time). A frequency parameter may correspond to a memory cell, a memory block, or another portion of the first location of a memory array. In some examples, data that is accessed relatively frequently (e.g., data associated with a frequency parameter that satisfies a threshold frequency) may be referred to as "hot" data and data that is accessed relatively infrequently (e.g., data associated with a frequency parameter that fails to satisfy a threshold frequency) may be referred to as "cold" data.

The memory system 210 may compare the one or more frequency parameters to one or more frequency thresholds. If a frequency parameter satisfies a frequency threshold (e.g., the frequency parameter indicates a frequency greater than or equal to a threshold frequency), the memory system 210 may refrain from transferring a corresponding portion of data to the second location. For example, data accessed (e.g., read) relatively frequently may correspond to a frequency parameter that satisfies the threshold (e.g., the memory system 210 may identify such data as hot data in response to tracking the frequency of access operations for the data). The memory system 210 may include the relatively frequently accessed data in the second portion of the data that is maintained at the first location in response to the parameter satisfying the threshold. By maintaining the hot data at the first location, the memory system 210 may realize relatively high performance (e.g., quick access times) if accessing the data using the access mode 220-*a*. Additionally or alternatively, if a frequency parameter fails to satisfy a frequency threshold, the memory system 210 may transfer the associated data to the second location (e.g., the memory system 210 may select the associated data as the first portion of data transferred to the second location in response to the unsatisfied frequency threshold). For example, cold data may correspond to a frequency parameter that fails to satisfy the threshold (e.g., the frequency parameter indicates a frequency less than a threshold frequency). The memory system 210 may transfer the data to the second location using the access mode 220-*b* in response to the frequency parameter failing to satisfy the threshold, which may result in improved memory density and memory utilization (e.g., due to a higher quantity of bits being stored per memory cell) for data that is accessed relatively infrequently.

In some examples, the memory system 210 may implement the techniques described herein based on other parameters. As one illustrative example, the memory system 210 may operate using the access mode 220-*a* at a first time. For instance, the memory system 210 may write data to the first location using the access mode 220-*a* and may subsequently relocate all the data to a second location using the access mode 220-*b*. The memory system 210 may determine that a total writes parameter satisfies a threshold (e.g., the memory system 210 may track a total quantity of writes for a memory array or a portion of a memory array). For example, the memory system 210 may determine that a total bytes written (TBW) count reaches a threshold percentage of an expected TBW for the life span of the memory system 210 (e.g., the TBW count may reach 30 percent of a quantity of writes). In such examples, the memory system 210 may selectively leave some data in the first location (e.g., using a first access mode 220-*a* such as SLC) and transfer other data to the second location (e.g., using a second access mode 220-*b* such as TLC) in response to the total writes parameter satisfying the threshold.

Additionally or alternatively, the memory system 210 may implement the techniques described herein based on a write boost mode. For example, a parameter may indicate that the write boost mode is activated as described herein (e.g., the host system 205 may indicate the write boost mode is activated). In other words, the memory system 210 may detect that the write boost mode is activated and select the first portion of data to transfer to the second location in response to the detection.

By selectively leaving some data in the first location using the access mode 220-*a* (e.g., maintaining SLC data in an SLC cache) and transferring some data to the second location using the access mode 220-*b* (e.g., transferring some SLC data to be stored in an MLC cache, a TLC cache, a QLC cache, etc.), the memory system may realize reduced wear for memory cells at the first location (e.g., extended lifespan of the memory system 110), improved memory utilization and/or memory density, or both, while maintaining relatively high performance, among other advantages.

Figure 3:
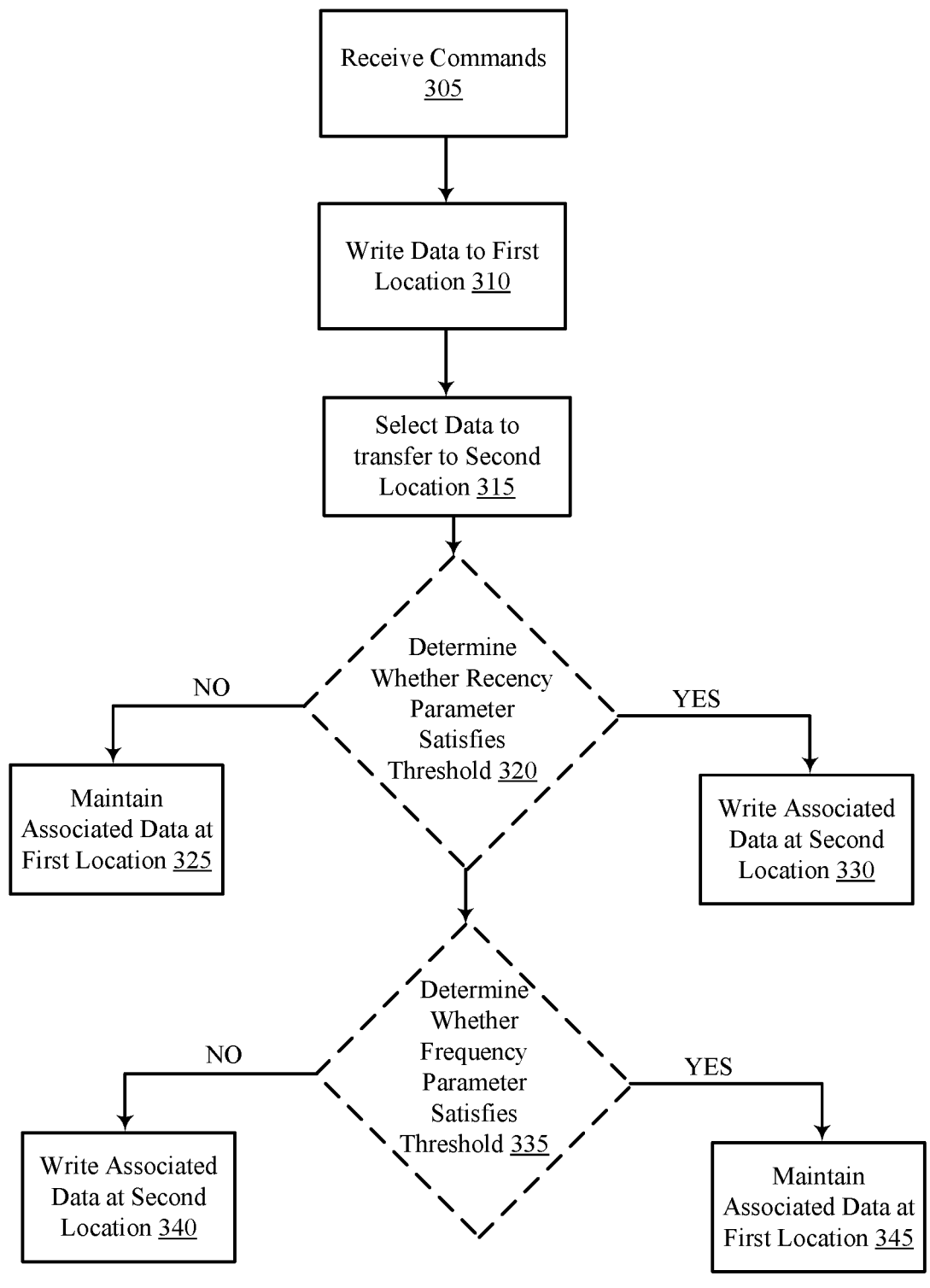
FIG. 3 illustrates an example of a process flow that supports memory management procedures for write boost mode in accordance with examples as disclosed herein.

FIG. 3 illustrates an example of a process flow 300 that supports memory management procedures for write boost mode in accordance with examples as disclosed herein. The process flow 300 may illustrate operations of a host system (e.g., a host system 105 as described with reference to FIG. 1), a memory system (e.g., a memory system 110 as described with reference to FIG. 1), or any combination thereof. For example, although operations of the process flow 300 are described as being performed by a memory system, some operations may additionally or alternatively be performed by a host system. Some operations may be added, removed, performed in different orders than shown, or any combination thereof.

At 305, one or more commands may be received. For example, a memory system (e.g., a memory system 110) may receive one or more access commands from a host system (e.g., a host system 105). In some examples, the one or more access commands may indicate data to write to the memory system.

At 310, data may be written to a first location. For example, the memory system may write data indicated by the commands to the first location using a first mode as described herein with reference to FIG. 2 (e.g., the memory system may write the data to an SLC cache using an SLC mode for storing one bit per memory cell in response to receiving the command).

At 315, data may be selected to rewrite to a second location. For example, the memory system may select a first portion of the data written at the first location to rewrite at a second location of the memory system using a second mode as described herein with reference to FIG. 2 (e.g., the memory system may write the data to a TLC cache using a TLC mode for storing three bits per memory cell, among other examples of access modes). Additionally or alternatively, the memory system may select a second portion of the data to maintain at the first location of the memory system. Such selection may be performed in response to one or more parameters satisfying one or more thresholds as described herein with reference to FIG. 2. For example, the memory system may determine whether one or more recency parameters satisfy one or more thresholds, whether one or more frequency parameters satisfy one or more thresholds, whether a quantity of writes of the memory system satisfies a threshold quantity of writes, whether a write booster mode of the memory system is activated, or any combination thereof.

In some examples, at 320 it may be determined whether a recency parameter satisfies a recency threshold. For example, the memory system may compare a recency parameter associated with a portion of data stored at the first location to a recency threshold. If the recency parameter fails to satisfy the recency threshold (e.g., the recency parameter indicates a duration less than a threshold duration), at 325 the data associated with the recency parameter may be maintained at the first location. For example, the memory system may maintain the portion of data associated with the recency parameter at the first location. As an illustrative example, data that has been stored at the first location for a relatively short duration may correspond to a recency parameter that fails to satisfy the threshold. The memory system may select such data for the second portion of the data that is maintained at the first location in response to the parameter failing to satisfy the threshold. Additionally or alternatively, if a recency parameter satisfies a recency threshold, at 330 the data associated with the recency parameter may be written at the second location. For example, the memory system may transfer the associated data to the second location (e.g., the memory system may select the associated data as the first portion of data transferred to the second location in response to the satisfied recency threshold). For example, data that has been stored at the first location for a relatively long duration may correspond to a recency parameter that satisfies the threshold (e.g., the recency parameter indicates a duration greater than a threshold duration). The memory system may transfer the data to the second location in response to the recency parameter satisfying the threshold.

In some examples, at 335 it may be determined whether a frequency parameter satisfies a frequency threshold. For example, the memory system may compare the frequency parameter associated with a portion of data at the first location to a frequency threshold. If a frequency parameter satisfies a frequency threshold (e.g., the frequency parameter indicates a frequency greater than or equal to a threshold frequency), at 345 the data may be maintained at the first location. For example, the memory system may refrain from transferring the corresponding portion of data to the second location. For example, data accessed (e.g., read) relatively frequently may correspond to a frequency parameter that satisfies the threshold (e.g., the memory system may identify such data as hot data in response to tracking the frequency of access operations for the data). The memory system may include the relatively frequently accessed data in the second portion of the data that is maintained at the first location in response to the parameter satisfying the threshold. By maintaining the hot data at the first location, the memory system may realize relatively high performance (e.g., quick access times) if accessing the data using the access mode 220-a. Additionally or alternatively, if a frequency parameter fails to satisfy a frequency threshold, at 340 the associated data may be written at the second location the memory system. For example, the memory system may transfer the associated data to the second location (e.g., the memory system may select the associated data as the first portion of data transferred to the second location in response to the unsatisfied frequency threshold). For example, cold data may correspond to a frequency parameter that fails to satisfy the threshold (e.g., the frequency parameter indicates a frequency less than a threshold frequency). The memory system may transfer the data to the second location using a second mode (e.g., a TLC access mode, an MLC access mode, and the like) in response to the frequency parameter failing to satisfy the threshold, which may result in improved memory density and memory utilization (e.g., due to a higher quantity of bits being stored per memory cell) for data that is accessed relatively infrequently, among other advantages.

Aspects of the process flow 300 may be implemented by a controller, among other components. Additionally or alternatively, aspects of the process flow 300 may be implemented as instructions stored in memory (e.g., firmware as described herein). For example, the instructions, when executed by a controller may cause the controller to perform the operations of the process flow 300.

Figure 4:
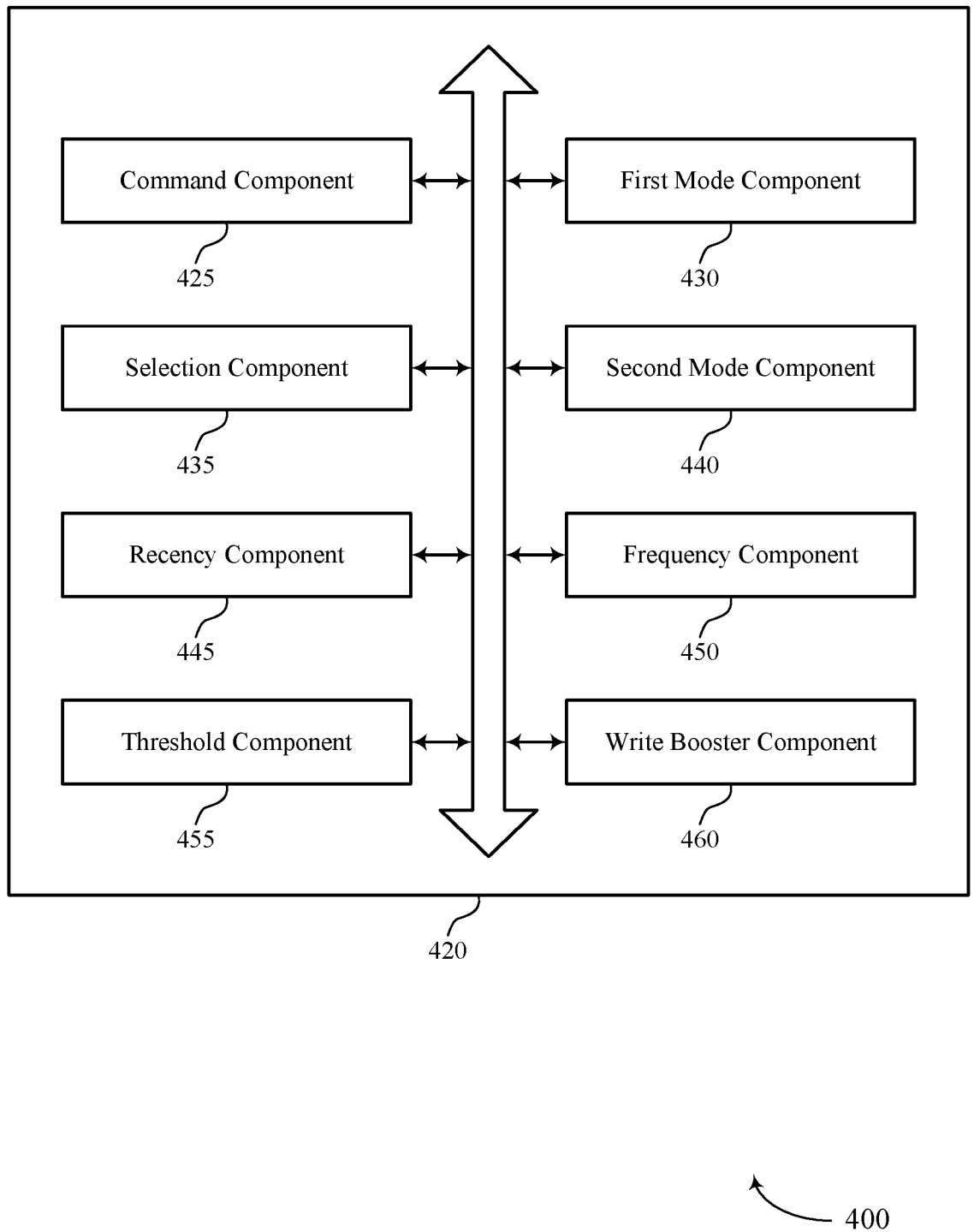
FIG. 4 shows a block diagram of a memory device that supports memory management procedures for write boost mode in accordance with examples as disclosed herein.

FIG. 4 shows a block diagram 400 of a memory device 420 that supports memory management procedures for write boost mode in accordance with examples as disclosed herein. The memory device 420 may be an example of aspects of a memory device as described with reference to FIGS. 1 through 3. The memory device 420, or various components thereof, may be an example of means for performing various aspects of memory management procedures for write boost mode as described herein. For example, the memory device 420 may include a command component 425, a first mode component 430, a selection component 435, a second mode component 440, a recency component 445, a frequency component 450, a threshold component 455, a write booster component 460, or any combination thereof. Each of these components may communicate, directly or indirectly, with one another (e.g., via one or more buses).

The command component 425 may be configured as or otherwise support a means for receiving a command to write data to the memory system. The first mode component 430 may be configured as or otherwise support a means for writing the data to a first location of the memory system using a first mode for storing one bit per memory cell based at least in part on receiving the command. The selection component 435 may be configured as or otherwise support a means for selecting a first portion of the data to rewrite to the memory system using a second mode for storing two or more bits per memory cell based at least in part on one or more parameters satisfying one or more thresholds. The second mode component 440 may be configured as or otherwise support a means for writing the first portion of the data to a second location of the memory system using the second mode based at least in part on selecting the first portion of the data. In some examples, the first mode component 430 may be configured as or otherwise support a means for maintaining a second portion of the data at the first location of the memory system based at least in part on the one or more parameters satisfying the one or more thresholds.

In some examples, the recency component 445 may be configured as or otherwise support a means for determining whether a recency parameter of the one or more parameters satisfies a recency threshold of the one or more thresholds, the recency parameter indicating a duration between writing the data to the first location and selecting the first portion of the data, where selecting the first portion of the data is based at least in part on determining whether the recency parameter satisfies the recency threshold.

In some examples, the recency component 445 may be configured as or otherwise support a means for selecting the first portion of the data is based at least in part on a first recency parameter of the one or more parameters associated with the first portion of the data failing to satisfy a recency threshold of the one or more thresholds, where maintaining the second portion of the data at the first location of the memory system using the first mode is based at least in part on a second recency parameter associated with the second portion satisfying the recency threshold.

In some examples, the frequency component 450 may be configured as or otherwise support a means for determining whether a frequency parameter of the one or more parameters satisfies a frequency threshold of the one or more thresholds, the frequency parameter indicating a frequency of access operations associated with the data, where selecting the first portion of the data is based at least in part on whether the frequency parameter satisfies the frequency threshold.

In some examples, the frequency component 450 may be configured as or otherwise support a means for selecting the first portion of the data is based at least in part on a first frequency parameter of the one or more parameters associated with the first portion of the data failing to satisfy a frequency threshold of the one or more thresholds, where maintaining the second portion of the data at the first location of the memory system using the first mode is based at least in part on a second frequency parameter associated with the second portion satisfying the frequency threshold.

In some examples, the first portion of the data corresponds to a first frequency lower than a second frequency corresponding to the second portion of the data.

In some examples, the threshold component 455 may be configured as or otherwise support a means for comparing a quantity of writes associated with the memory system to a threshold quantity of writes, where writing the first portion of the data to the second location of the memory system using the second mode is based at least in part on the quantity of writes satisfying the threshold quantity of writes.

In some examples, the write booster component 460 may be configured as or otherwise support a means for detecting that a write booster mode of the memory device is activated, where writing the data to the first location of the memory device using the first mode for storing one bit per memory cell is based at least in part on the activated write booster mode.

In some examples, the first mode includes a SLC mode and the second mode includes a MLC mode, a TLC mode, or a QLC mode.

Figure 5:
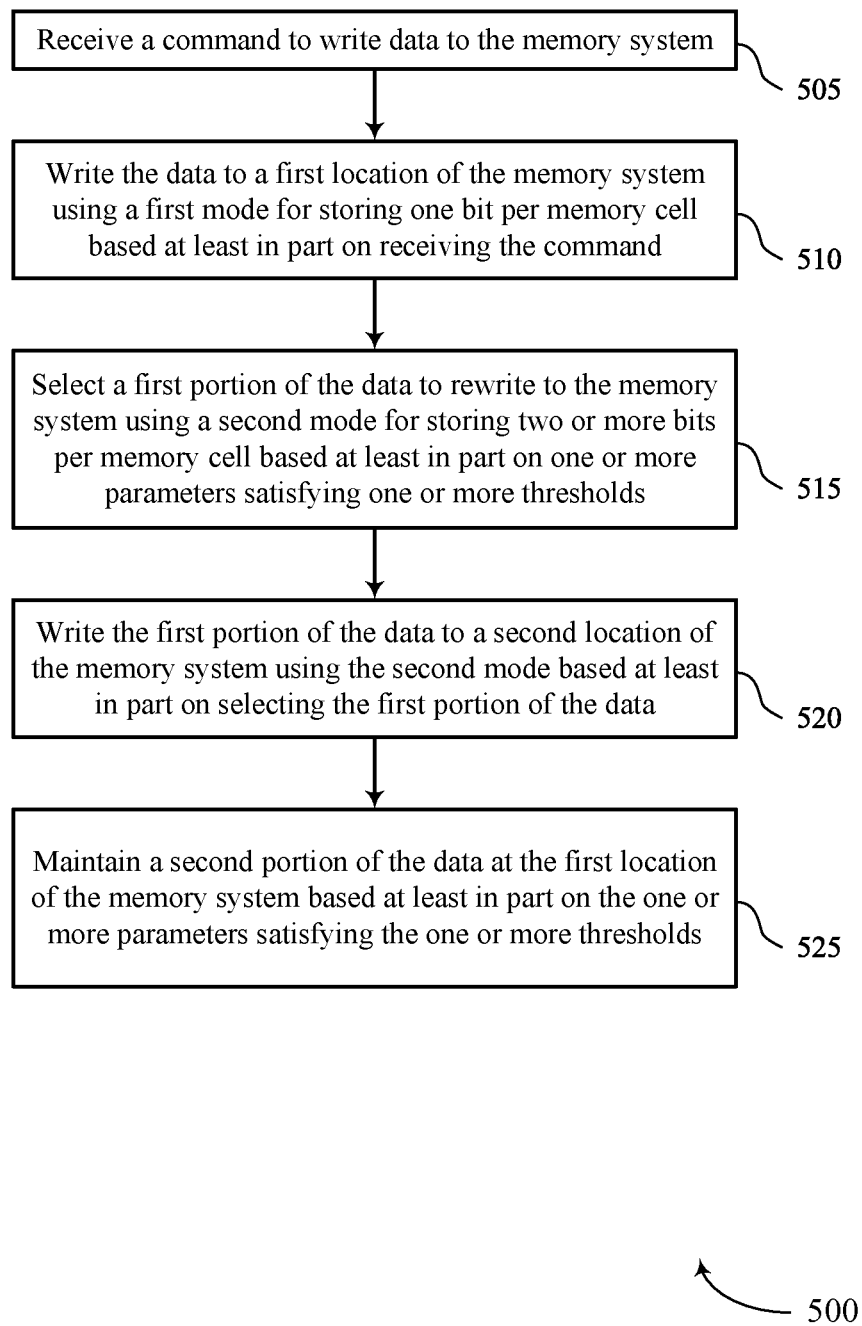
FIG. 5 shows a flowchart illustrating a method or methods that support memory management procedures for write boost mode in accordance with examples as disclosed herein.

FIG. 5 shows a flowchart illustrating a method 500 that supports memory management procedures for write boost mode in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 505, the method may include receiving a command to write data to the memory system. The operations of 505 may be performed in accordance with examples as disclosed herein. In some examples, aspects of the operations of 505 may be performed by a command component 425 as described with reference to FIG. 4.

At 510, the method may include writing the data to a first location of the memory system using a first mode for storing one bit per memory cell based at least in part on receiving the command. The operations of 510 may be performed in accordance with examples as disclosed herein. In some examples, aspects of the operations of 510 may be performed by a first mode component 430 as described with reference to FIG. 4.

At 515, the method may include selecting a first portion of the data to rewrite to the memory system using a second mode for storing two or more bits per memory cell based at least in part on one or more parameters satisfying one or more thresholds. The operations of 515 may be performed in accordance with examples as disclosed herein. In some examples, aspects of the operations of 515 may be performed by a selection component 435 as described with reference to FIG. 4.

At 520, the method may include writing the first portion of the data to a second location of the memory system using the second mode based at least in part on selecting the first portion of the data. The operations of 520 may be performed in accordance with examples as disclosed herein. In some examples, aspects of the operations of 520 may be performed by a second mode component 440 as described with reference to FIG. 4.

At 525, the method may include maintaining a second portion of the data at the first location of the memory system based at least in part on the one or more parameters satisfying the one or more thresholds. The operations of 525 may be performed in accordance with examples as disclosed herein. In some examples, aspects of the operations of 525 may be performed by a first mode component 430 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a command to write data to the memory system, writing the data to a first location of the memory system using a first mode for storing one bit per memory cell based at least in part on receiving the command, selecting a first portion of the data to rewrite to the memory system using a second mode for storing two or more bits per memory cell based at least in part on one or more parameters satisfying one or more thresholds, writing the first portion of the data to a second location of the memory system using the second mode based at least in part on selecting the first portion of the data, and maintaining a second portion of the data at the first location of the memory system based at least in part on the one or more parameters satisfying the one or more thresholds.

Some examples of the method 500 and the apparatus described herein may further include operations, features, circuitry, logic, means, or instructions for determining whether a recency parameter of the one or more parameters satisfies a recency threshold of the one or more thresholds, the recency parameter indicating a duration between writing the data to the first location and selecting the first portion of the data, where selecting the first portion of the data may be based at least in part on determining whether the recency parameter satisfies the recency threshold.

Some examples of the method 500 and the apparatus described herein may further include operations, features, circuitry, logic, means, or instructions for selecting the first portion of the data may be based at least in part on a first recency parameter of the one or more parameters associated with the first portion of the data failing to satisfy a recency threshold of the one or more thresholds, where maintaining the second portion of the data at the first location of the memory system using the first mode may be based at least in part on a second recency parameter associated with the second portion satisfying the recency threshold.

Some examples of the method 500 and the apparatus described herein may further include operations, features, circuitry, logic, means, or instructions for determining whether a frequency parameter of the one or more parameters satisfies a frequency threshold of the one or more thresholds, the frequency parameter indicating a frequency of access operations associated with the data, where selecting the first portion of the data may be based at least in part on whether the frequency parameter satisfies the frequency threshold.

Some examples of the method 500 and the apparatus described herein may further include operations, features, circuitry, logic, means, or instructions for selecting the first portion of the data may be based at least in part on a first frequency parameter of the one or more parameters associated with the first portion of the data failing to satisfy a frequency threshold of the one or more thresholds, where maintaining the second portion of the data at the first location of the memory system using the first mode may be based at least in part on a second frequency parameter associated with the second portion satisfying the frequency threshold.

In some examples of the method 500 and the apparatus described herein, the first portion of the data corresponds to a first frequency lower than a second frequency corresponding to the second portion of the data.

Some examples of the method 500 and the apparatus described herein may further include operations, features, circuitry, logic, means, or instructions for comparing a quantity of writes associated with the memory system to a threshold quantity of writes, where writing the first portion of the data to the second location of the memory system using the second mode may be based at least in part on the quantity of writes satisfying the threshold quantity of writes.

Some examples of the method 500 and the apparatus described herein may further include operations, features, circuitry, logic, means, or instructions for detecting that a write booster mode of the memory device may be activated, where writing the data to the first location of the memory device using the first mode for storing one bit per memory cell may be based at least in part on the activated write booster mode.

In some examples of the method 500 and the apparatus described herein, the first mode includes a SLC mode and the second mode includes a MLC mode, a TLC mode, or a QLC mode.

Aspects of the method 500 may be implemented by a controller, among other components. Additionally or alternatively, aspects of the method 500 may be implemented as instructions stored in memory (e.g., firmware as described herein). For example, the instructions, when executed by a controller may cause the controller to perform the operations of the method 500.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive, from a host system, a command to write data to the one or more memory devices;

receive a signal to activate a write booster mode of the one or more memory devices;

write the data to a first location of the one or more memory devices using a first mode for storing one bit per memory cell in response to receiving the command from the host system to write the data and receiving the signal to activate the write booster mode;

select a first portion of the data to rewrite to the one or more memory devices using a second mode for storing three or more bits per memory cell in response to one or more parameters satisfying one or more thresholds;

rewrite the first portion of the data to a second location of the one or more memory devices using the second mode in response to selecting the first portion of the data and receiving the signal to activate the write booster mode; and maintain a second portion of the data at the first location of the one or more memory devices in response to the one or more parameters satisfying the one or more thresholds.

2. The memory system of claim 1, wherein the processing circuitry is further configured to cause the memory system to:

determine whether a recency parameter of the one or more parameters satisfies a recency threshold of the one or more thresholds, the recency parameter indicating a duration between writing the data to the first location and selecting the first portion of the data, wherein the first portion of the data is selected in response to determining whether the recency parameter satisfies the recency threshold.

3. The memory system of claim 1, wherein:

the first portion of the data is selected in response to a first recency parameter of the one or more parameters associated with the first portion of the data failing to satisfy a recency threshold of the one or more thresholds, and the second portion of the data is maintained at the first location of the one or more memory devices using the first mode in response to a second recency parameter associated with the second portion satisfying the recency threshold.

4. The memory system of claim 1, wherein the processing circuitry is further configured to cause the memory system to:

determine whether a frequency parameter of the one or more parameters satisfies a frequency threshold of the one or more thresholds, the frequency parameter indicating a frequency of access operations associated with the data, wherein the first portion of the data is selected in accordance with whether the frequency parameter satisfies the frequency threshold.

5. The memory system of claim 1, wherein:

the first portion of the data is selected in response to a first frequency parameter of the one or more parameters associated with the first portion of the data failing to satisfy a frequency threshold of the one or more thresholds, and the second portion of the data is maintained at the first location of the one or more memory devices using the first mode in response to a second frequency parameter associated with the second portion satisfying the frequency threshold.

6. The memory system of claim 5, wherein the first portion of the data corresponds to a first frequency lower than a second frequency corresponding to the second portion of the data.

7. The memory system of claim 1, wherein the processing circuitry is further configured to cause the memory system to:

compare a quantity of writes associated with the one or more memory devices to a threshold quantity of writes, wherein the first portion of the data is written to the second location of the one or more memory devices using the second mode in response to the quantity of writes satisfying the threshold quantity of writes.

8. The memory system of claim 1, wherein:

the first mode comprises a single level cell (SLC) mode, and the second mode comprises a tri level cell (TLC) mode, or a quad level cell (QLC) mode.

9. A non-transitory computer-readable medium storing code comprising instructions which, when executed by a one or more processors of one or more electronic devices, cause the one or more electronic devices to:

receive, from a host system, a command to write data to a memory system;

receive a signal to activate a write booster mode of the memory system is activated;

write the data to a first location of the memory system using a first mode for storing one bit per memory cell in response to receiving the command from the host system to write the data and receiving the signal to activate the write booster mode;

select a first portion of the data to rewrite to the memory system using a second mode for storing three or more bits per memory cell in response to one or more parameters satisfying one or more thresholds;

rewrite the first portion of the data to a second location of the memory system using the second mode in response to selecting the first portion of the data and receiving the signal to activate the write booster mode; and maintain a second portion of the data at the first location of the memory system in response to the one or more parameters satisfying the one or more thresholds.

10. The non-transitory computer-readable medium of claim 9, wherein the instructions, when executed by the one or more processors of the one or more electronic devices, further cause the one or more electronic devices to:

determine whether a recency parameter of the one or more parameters satisfies a recency threshold of the one or more thresholds, the recency parameter indicating a duration between writing the data to the first location and selecting the first portion of the data, wherein the first portion of the data is selected in response to determining whether the recency parameter satisfies the recency threshold.

11. The non-transitory computer-readable medium of claim 9, wherein:

the first portion of the data is selected in response to a first recency parameter of the one or more parameters associated with the first portion of the data failing to satisfy a recency threshold of the one or more thresholds, and the second portion of the data is maintained at the first location of the memory system using the first mode in response to a second recency parameter associated with the second portion satisfying the recency threshold.

12. The non-transitory computer-readable medium of claim 9, wherein the instructions, when executed by the one or more processors of the one or more electronic devices, further cause the one or more electronic devices to:

determine whether a frequency parameter of the one or more parameters satisfies a frequency threshold of the one or more thresholds, the frequency parameter indicating a frequency of access operations associated with the data, wherein the first portion of the data is selected in accordance with whether the frequency parameter satisfies the frequency threshold.

13. The non-transitory computer-readable medium of claim 9, wherein:

the first portion of the data is selected in response to a first frequency parameter of the one or more parameters associated with the first portion of the data failing to satisfy a frequency threshold of the one or more thresholds, and the second portion of the data is maintained at the first location of the memory system using the first mode in response to a second frequency parameter associated with the second portion satisfying the frequency threshold.

14. The non-transitory computer-readable medium of claim 13, wherein the first portion of the data corresponds to a first frequency lower than a second frequency corresponding to the second portion of the data.

15. A method performed by a memory system, the method comprising:

receiving, from a host system, a command to write data to the memory system;

receive a signal to activate a write booster mode of the memory system;

writing the data to a first location of the memory system using a first mode for storing one bit per memory cell in response to receiving the command from the host system to write the data and receiving the signal to activate the write booster mode;

selecting a first portion of the data to rewrite to the memory system using a second mode for storing three or more bits per memory cell in response to one or more parameters satisfying one or more thresholds;

rewrite the first portion of the data to a second location of the memory system using the second mode in response to selecting the first portion of the data and receiving the signal to activate the write booster mode; and maintaining a second portion of the data at the first location of the memory system in response to the one or more parameters satisfying the one or more thresholds.

16. The method of claim 15, further comprising:

determining whether a recency parameter of the one or more parameters satisfies a recency threshold of the one or more thresholds, the recency parameter indicating a duration between writing the data to the first location and selecting the first portion of the data, wherein the first portion of the data is selected in response to determining whether the recency parameter satisfies the recency threshold.

17. The method of claim 15, wherein:

the first portion of the data is selected in response to a first recency parameter of the one or more parameters associated with the first portion of the data failing to satisfy a recency threshold of the one or more thresholds, and the second portion of the data is maintained at the first location of the memory system using the first mode in response to a second recency parameter associated with the second portion satisfying the recency threshold.

18. The method of claim 15, further comprising:

determining whether a frequency parameter of the one or more parameters satisfies a frequency threshold of the one or more thresholds, the frequency parameter indicating a frequency of access operations associated with the data, wherein the first portion of the data is selected in accordance with whether the frequency parameter satisfies the frequency threshold.

19. The method of claim 15, wherein:

the first portion of the data is selected in response to a first frequency parameter of the one or more parameters associated with the first portion of the data failing to satisfy a frequency threshold of the one or more thresholds, and the second portion of the data is maintained at the first location of the memory system using the first mode in response to a second frequency parameter associated with the second portion satisfying the frequency threshold.

20. The method of claim 19, wherein the first portion of the data corresponds to a first frequency lower than a second frequency corresponding to the second portion of the data.

21. The method of claim 15, further comprising:

comparing a quantity of writes associated with the memory system to a threshold quantity of writes, wherein the first portion of the data is written to the second location of the memory system using the second mode in response to the quantity of writes satisfying the threshold quantity of writes.

* * * * *